United States Patent
Hueter et al.

(10) Patent No.: US 10,290,039 B2
(45) Date of Patent: May 14, 2019

(54) SYSTEM AND METHOD FOR AUTOMATING MARKET ANALYSIS FROM ANONYMOUS BEHAVIOR PROFILES

(75) Inventors: Geoffrey J. Hueter, San Diego, CA (US); Steven C. Quandt, Encinitas, CA (US)

(73) Assignee: CERTONA CORPORATION, San Diego, CA (US)

( * ) Notice: Subject to any disclaimer, the term of this patent is extended or adjusted under 35 U.S.C. 154(b) by 509 days.

(21) Appl. No.: 12/416,524

(22) Filed: Apr. 1, 2009

(65) Prior Publication Data

US 2009/0248496 A1     Oct. 1, 2009

Related U.S. Application Data

(60) Provisional application No. 61/041,447, filed on Apr. 1, 2008.

(51) Int. Cl.
| | |
|---|---|
| *G06Q 30/02* | (2012.01) |
| *G06Q 30/06* | (2012.01) |
| *G06N 20/00* | (2019.01) |
| *G06Q 10/00* | (2012.01) |

(Continued)

(52) U.S. Cl.
CPC ......... *G06Q 30/0631* (2013.01); *G06N 20/00* (2019.01); *G06Q 10/00* (2013.01); *G06Q 30/00* (2013.01); *G06Q 30/0185* (2013.01); *G06Q 30/0201* (2013.01); *G06Q 30/0202* (2013.01); *G06Q 30/0204* (2013.01); *G06Q 30/0255* (2013.01); *G06Q 30/0269* (2013.01); *H04L 51/12* (2013.01)

(58) Field of Classification Search
None
See application file for complete search history.

(56) References Cited

U.S. PATENT DOCUMENTS

| | | | | |
|---|---|---|---|---|
| 5,704,017 A | * | 12/1997 | Heckerman et al. | 706/12 |
| 6,026,397 A | * | 2/2000 | Sheppard | G06F 17/3071 |
| 6,134,532 A | * | 10/2000 | Lazarus et al. | 705/14.25 |

(Continued)

OTHER PUBLICATIONS

Mobasher, "Discovery and Evaluation of Aggregate Usage Profiles for Web Personalization," Data Mining and Knowledge Discovery, 2002, vol. 6, No. 1, pp. 61-82.*

(Continued)

*Primary Examiner* — Ivan R Goldberg
(74) *Attorney, Agent, or Firm* — Richard D. Clarke

(57) ABSTRACT

A system and method is disclosed for profiling subjects and objects based on subjects' responses to various objects, for purposes of determining and presenting the objects most likely to generate the most likely response from each visitor. Object ratings are explicitly submitted by subjects or derived implicitly from visitor interactions with the objects. A profiling engine processes the ratings information and generates compact profiles of each subject and object based on similarities and differences in affinities between the group of subjects and the group of objects. The object profiles can be clustered to create behavioral object categories. Additionally, a modeling module inverts the abstract subject and object profiles into marketing attributes. The system has application in market analysis and segmentation, behavioral targeting, product placement, and online advertising, to name but a few applications.

17 Claims, 7 Drawing Sheets

(51) Int. Cl.
*G06Q 30/00* (2012.01)
*H04L 12/58* (2006.01)

(56) References Cited

U.S. PATENT DOCUMENTS

| | | | |
|---|---|---|---|
| 6,345,264 B1* | 2/2002 | Breese et al. | 706/21 |
| 6,370,513 B1* | 4/2002 | Kolawa et al. | 705/7.33 |
| 7,102,067 B2* | 9/2006 | Gang et al. | 84/600 |
| 7,949,565 B1* | 5/2011 | Eldering et al. | 705/14.49 |
| 2001/0014868 A1* | 8/2001 | Herz | G06Q 10/0637 |
| | | | 705/14.38 |
| 2001/0025259 A1* | 9/2001 | Rouchon | 705/26 |
| 2002/0128884 A1* | 9/2002 | Heching et al. | 705/7 |
| 2002/0129368 A1* | 9/2002 | Schlack et al. | 725/46 |
| 2003/0004781 A1* | 1/2003 | Mallon et al. | 705/10 |
| 2003/0089218 A1* | 5/2003 | Gang et al. | 84/615 |
| 2003/0149676 A1* | 8/2003 | Kasabov | G06N 3/0436 |
| | | | 706/2 |
| 2004/0054572 A1* | 3/2004 | Oldale et al. | 705/10 |
| 2004/0076936 A1* | 4/2004 | Horvitz et al. | 434/236 |
| 2004/0117239 A1* | 6/2004 | Mittal et al. | 705/10 |
| 2004/0243570 A1* | 12/2004 | Gross | 707/3 |
| 2004/0260574 A1* | 12/2004 | Gross | G06Q 30/02 |
| | | | 705/1.1 |
| 2005/0102292 A1* | 5/2005 | Tamayo et al. | 707/10 |
| 2006/0026048 A1* | 2/2006 | Kolawa et al. | 705/7 |
| 2006/0041548 A1* | 2/2006 | Parsons et al. | 707/5 |
| 2007/0073681 A1* | 3/2007 | Adar | G06F 17/30861 |
| 2007/0112792 A1* | 5/2007 | Majumder | 707/100 |
| 2007/0156508 A1* | 7/2007 | Gilpin | G06Q 10/0637 |
| | | | 705/7.36 |
| 2007/0276721 A1* | 11/2007 | Jackson | 705/10 |
| 2008/0059512 A1* | 3/2008 | Roitblat et al. | 707/102 |
| 2008/0065464 A1* | 3/2008 | Klein | G06Q 30/02 |
| | | | 705/7.31 |
| 2008/0077575 A1* | 3/2008 | Tateno et al. | 707/5 |
| 2008/0270398 A1* | 10/2008 | Landau et al. | 707/6 |
| 2008/0306895 A1* | 12/2008 | Karty | 706/52 |
| 2010/0100516 A1* | 4/2010 | Zhou et al. | 706/46 |

OTHER PUBLICATIONS

Shahabi, "A Framework for Efficient and Anonymous Web Usage Mining Based on Client-Side Tracking," WBKDD 2001, p. 113-144.*

Herlocker, "Evaluating Collaborative Filtering Recommender Systems," 2004, ACM Transactions on Information Systems, vol. 22, No. 1, pp. 5-53.*

Merriam-Webster, "Merriam-Webster's Collegiate Dictionary," (11th Ed. 2004), p. 236.*

* cited by examiner

Fig. 5 ly limited in explanatory power, but the method is also dependent on the ability to acquire demographic information for each subject, which in most cases is costly to obtain.

SYSTEM AND METHOD FOR AUTOMATING MARKET ANALYSIS FROM ANONYMOUS BEHAVIOR PROFILES

FIELD OF THE INVENTION

The present invention relates to electronically marketing goods, services, content, and other entities through the automated analysis of human behavior. Particularly, the invention relates to the representation of subject and object characteristics for purposes of automating the market analysis of products, services, media and other content categories; analysis and prediction of product or service market penetration by product profile; self-categorization of products by aesthetic similarity; and reverse modeling of subject or object profiles to demographic, psychological, physical, or other characteristics. The system has application in market analysis and segmentation, behavioral targeting, product placement, and online advertising, to name but a few applications.

BACKGROUND OF THE INVENTION

The consumer faces a profound number of possible choices when selecting most kinds of products, be it movies, music, books, travel, art, dining, employers, and so on, to the extent that the consumer must choose from well-publicized possibilities, such as through advertising, or rely on recommendations of others. In the first case the set of choices is severely limited to those that can be promoted to a broad audience. In the second case the consumer must weigh the similarity of his or her own tastes to the person making the recommendation, whether it be an acquaintance or media. In addition, the number of possibilities and the cost of acquisition, both in terms of time and money, of assessing possibilities, make it infeasible to sample a large number of possibilities to determine which are of interest to the consumer.

Recommendation systems rely on trying to best match a person's individual preferences to the characteristics of the available items. In general what is known about the subjects and objects is the set of affinities between subjects and objects, where the affinity $\{A_{ij}\}$ between subject i and object j is determined by explicit feedback from the subject or inferred from the subject's interaction (or non-interaction) with the object. The consistency of the affinity scale from subject to subject and object to object derives from the consistency of the goal of the subjects in the given environment, for example to make a purchase in a commerce environment or to read articles in a content environment.

The primary goal of the recommendation system is to predict for a given subject those objects for which the subject will have the greatest affinity. In general the subject characteristics can be represented by a vector $S=(S_1, S_2, \ldots, S_L)$ and the object characteristics can be represented by a vector $B=(B_1, B_2, \ldots, B_M)$, whereby the predicted affinity of the subject to the object is a function $P=f(S, B)$. Various recommendation systems then differ in their representation of subject and object characteristics S and B and the similarity function f.

One method that has been used, commonly referred to as collaborative filtering, is to represent the subject as the set of object ratings that the subject has provided; i.e., $S=\{R_1, R_2, \ldots, R_L\}$, where $R_i$ is the subject's rating of object i. In most scenarios where recommendations are of use, the number of available items (e.g., such as catalog size) is going to be much larger than the number of items that have been rated by the subject, and so the set S is sparse. To generate a recommendation of a particular object to a particular subject, the subject's profile is compared to the profiles of other subjects that have rated the object. Given the similarities and dissimilarities of objects that have been rated in common, an estimate of the subject's response is generated. In a recommendation system, the system would generate estimates for a variety of objects rated by similar people and return as recommendations the objects with the highest predicted ratings.

Effectively, this type of system is a "mentored" system, whereby each subject is matched to a set of other subjects with similar tastes that have rated objects that the subject has not rated. This approach has several drawbacks, which include: recommendations can only be made where the subject's small set of mentors have provided coverage; the method is dependent on a class of users that have provided a large number of ratings (i.e., mentors), or else the system database must be searched to provide mentors appropriate to each requested object; the method is limited in capacity to make recommendations across various categories (cross marketing); the method does not make full use of all data for each subject (that is, the method is restricted to the subset of mentors); the representation of the subject, which is the set of ratings for each rated object, is not compact and increases linearly with the number of rated objects; subject representations are not portable to other recommendation systems; requires lengthy questionnaires to introduce a new subject into the system; and faces combinatorial challenges to find the best mentor for a given user and is therefore not scalable to large user populations.

Additional desired characteristics of a recommendation system that cannot be addressed by the mentor method include inverse modeling of subject representations back to physical attributes, such as demographics or psychographics, and identification and representation of object similarities.

Another approach is shopping basket analysis, which makes suggestions based on objects that have been purchased by other subjects at the same time as an object that has been selected by the targeted subject. However, this approach relies on transactional dependency and does not allow prediction of preference for objects that are not purchased together. In particular this method, cannot associate subject/object affinities across catalog or across time as catalog items are replaced by similar items. Shopping basket analysis is also not specific to individual subjects, but rather to aggregate transaction histories across all subjects. By contrast, the present invention automatically normalizes all product profiles across product categories and can combine information across single vendor transaction histories.

Other approaches classify objects according to expert defined categories or attributes, whereby each object is rated by each, attribute and then recommendations are made by matching the expressed interests of the subject to the attributes of the objects. Expert systems have the drawback that they are not self-adapting; that is, they require expert classification or coding. This means that such systems are specific to a single product domain. Also, because they are not data driven, they are not able to process large, diverse, and constantly changing transaction histories.

Predictive modeling techniques use demographics to model subjects. Not only are demographics an indirect substitute for aesthetic opinions and therefore inherently inaccurate, this is invasive of the subject's privacy and only specific to groups of subjects and not to individual subjects.

SUMMARY OF THE INVENTION

In accordance with the present invention, a method and system is presented for collecting subjects' affinities to objects, extracting subject and object profiles, and generating recommendations to subjects of objects that were rated by other subjects. This invention is sometimes referred to in this patent by its commercial trademarked name, Resonance®.

An object of the invention is to provide a means of recommending objects to subjects based on either explicit or behaviorally inferred ratings of other subjects of those objects and of commonly rated objects.

Another object of the invention is to compactly and uniformly represent subject and object profiles so that the affinity, or preference, of the subject to the object can be quickly and efficiently predicted, and so that the number of features in the profiles of the subjects and objects is not directly dependent on the number of subjects or objects in the system.

Another object of the invention is to create a representation of objects that, is universal across all types of objects, so that all types of objects can be compared to one another and the subject's interaction with one set of objects can be extrapolated to other types of objects, and that the representation is derived solely from the collective interaction of subjects with the set of objects (catalog) and does not require detailed object information or expert knowledge of object characteristics.

Another object of the invention is to enable the use of all subject-object interactions, and not just, for example, purchase behavior, to form profiles of subject and objects for faster profiling and greater accuracy and responsiveness to temporal changes in site merchandising or customer behavior.

Another object of the invention is to create object profiles as well as subject profiles, so that objects can be readily indexed by aesthetic or other categories and so that objects can be readily associated across product categories by aesthetic similarity.

Another object of the invention is to create subject and object profiles that can be used to relate the derived aesthetic attributes to other objective measures of subjects, such as personality type or demographics, and objects, such as color or shape.

Another object of the invention is to collect ratings information from multiple applications while protecting the anonymity of the subject across different applications and minimizing the need to normalize object information (metadata) across catalogs.

Another object of the invention is to combine the recommendations of the system with explicit human merchandising objectives either through "hard" rules that filter results by specified criteria or "soft" rules that bias the results towards a defined business goal.

Another object of the invention is to provide recommendations to groups of subjects based on the best, match to their collective profiles.

Another object of the invention is to enhance product and content marketing by characterizing the attributes of object profiles.

Another object of the invention is to identify appropriate subjects for the marketing of a particular object.

The present invention is a system and method for predicting subject responses to objects based on other subjects' responses to that and other objects. The process of matching subject and object profiles produces a predicted response score that can be used to rank recommended content. The scores can be used as is or combined with other business logic to render the final recommendation rank. The invention can be applied to a broad range of applications, including the retailing of single consumption items, such as non-recurring purchases or content views, where the previous purchase or view of an object cannot be used to predict additional purchases or views of the same object. The invention can also be used to predict subject responses to recurring purchases and to recommend new consumables.

The invention considers the interaction of subjects and objects. The subject is an active entity that initiates transactions. The subject consumes or experiences objects and provides feedback on the level of satisfaction with the object. The subject could be a single person or a corporate entity, such as a business. The object is a passive target of interaction by the subject. This could be a physical object, such as a consumer good, for example cars, MP3 player, or ice cream; media, such as music, movies, books, art, or plays; or even a person, as in the case of a job search or a matchmaking service. In the case of active entities, it is possible for the subject and object to reverse roles depending on the situation.

The invention provides a novel solution to the problem of how to identify objects, for example products, that will appeal to a particular subject, for example a person, where the large number of possible objects, including less desirable objects that are descriptively similar but aesthetically different or where some objects may appeal highly to a limited population of subjects while being undesirable to the broader population, makes it difficult for the subject to notice the objects that the subject wants simply by browsing the entire set of objects. This provides a breakthrough for target marketing and retail applications because it allows the consumer, solely by behavior, to "self-market" or "pull" those products which are of interest, rather than requiring that, retailers "push" potentially unwanted products through advertising or other inefficient means.

The invention also addresses the issue of consumer privacy because it does not profile the consumer using personal demographics information, which consumers find both invasive and tedious to enter. Thus Resonance improves retailers' ability to target customers, while simultaneously making it easier for consumers to participate.

The invention works by forming profiles of subjects, for example consumers, and objects, such as goods or media, based on aesthetic evaluations of objects by subjects. The invention does not require a priori information about either subjects, such as demographics or psychographics, or objects, such as classifications of genres. Rather, it automatically generates representations of subjects and objects solely from the subjects' interaction with the objects. Because it creates its own abstract representation of subjects, it allows retailers to transparently target the subject without compromising subject privacy through the collection and modeling of sensitive personal information. The profiles can also be extended across catalogs, product or content domains, or across websites or stores.

Note that the identification of subjects and objects is not a physical one and may change depending on the application. For example, in a consumer movie recommendation application, the person requesting recommendations is the subject and the movie is the object. In a dating service application, a person would be considered a subject when searching for matches and an object when being searched by others. Similarly, in the case of employer employee matching, companies and persons would alternate between the roles of subject and object. Note that in cases where an entity can assume different roles, a different profile would be created for each role.

Because the profiles are symmetric, that is both subjects and objects are profiled to the same representation, subjects can be matched to other subjects or objects, and objects can be matched to other objects or subjects. For example subject-subject matching could be used on a social networking site to connect people of like interests or on an online store to order product reviews according to the similarity of the reviewer to the reader. Similarly, object-object matching can be used to match keywords to products or content, advertisements to news articles, or promotional banners to referring affiliate sites.

Subjects and objects are represented as a set of derived abstract attributes, or feature vectors. In addition to driving the matching process, the distributions of the dimensions can be used to predict which items will evoke strong reactions (negative and positive) from a typical group of subjects and which items will evoke a more even response across those subjects.

The invention also relates to the field of neural networks and optimization. Generally, neural networks take an input vector through a transfer function to produce an output. Neural network training methods are classified into supervised and unsupervised models. In supervised models the training method adapts the weights of the transfer function to minimize some function of the outputs, such as the mean squared error between the outputs produced by the transformation of the inputs and the expected outputs, which are known for a certain set of inputs commonly known as the training set. Once the weights have been trained, the network can be used to predict outputs for operational inputs. In unsupervised networks the data is clustered in some way that makes it useful for subsequent processing; however, the desired result, namely the closest matching template, is not known during training.

The proposed method is supervised insofar as the desired outputs are known as part of a training set; however, similar to unsupervised methods, the method is also self-organizing insofar as the inputs are not known; i.e., the method derives the input values using a known transfer function and known outputs.

Because of the large number of weights or adapted parameters of the system, which scales as the number of subjects and objects, a key aspect of the method is that the weights for each subject or object are decoupled from other subjects and objects when updated separately. This allows individual subjects and objects to be trained by different processing units, which allows the method to scale up to large numbers of subjects and objects, which may ultimately total millions or tens of millions or more.

A key improvement of the invention over market segmentation is that it does not require pre-defined descriptors or attributes of subjects and objects, rather the system derives the attributes that describe subjects and objects from the behavior of the subjects interacting with the objects. This allows the system to create novel targeted categories and identify niche markets and estimate market penetration for a selected products, content, or object of interest. The system provides several other advantages, including straightforward cross marketing across product categories and sorting of objects by aesthetic categories for purposes of browsing and selecting items for consumption or association, such as selecting musical recordings or product placements to go with a movie production.

BRIEF DESCRIPTION OF THE DRAWINGS

FIG. 2 shows an embodiment of a user interface that displays objects that elicit strong responses, both positive and negative, from different subjects.

FIG. 3 shows an embodiment of a user interface that displays objects that are generally acceptable to a wide group of subjects.

FIG. 4 shows an embodiment of a user interface that displays objects that have high penetration, or recognition, into a group of subjects.

FIG. 5 shows an embodiment of a user interface that displays objects that have low penetration, or recognition, into a group of subjects.

DETAILED DESCRIPTION OF THE DRAWINGS

Figure 1A:
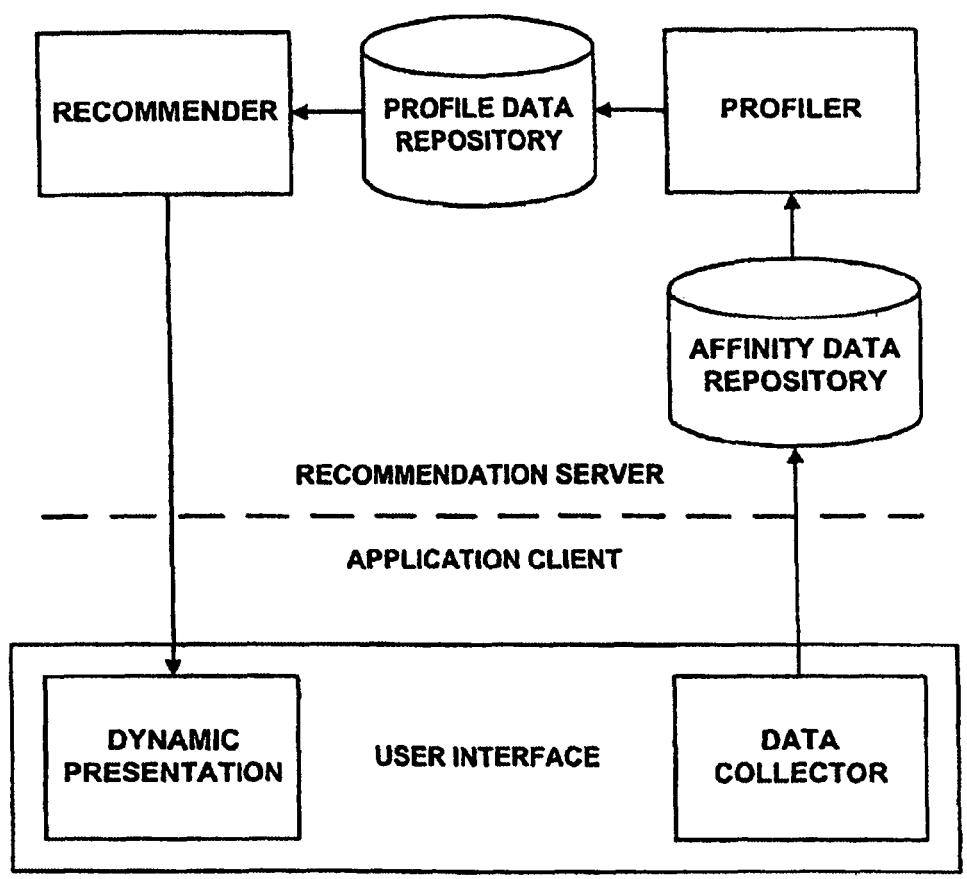
FIG. 1A shows the principal components of the system and FIG. 1B shows the operation of the system to classify objects according to marketing criteria.

The following detailed description is related to the technology disclosed in U.S. patent application Ser. No. 12/415,758 filed on Mar. 31, 2009, now U.S. Pat. No. 8,566,256 issued on Oct. 22, 2013, U.S. patent application Ser. No. 12/416,005 filed on Mar. 31, 2009, now U.S. Pat. No. 9,916,611 issued on Mar. 13, 2018, and U.S. patent application Ser. No. 12/416,083 filed, on Mar. 31, 2009, and all are incorporated by reference herein, in their entirety. FIG. 1B shows the operation of the system to classify objects according to marketing criteria. Classifications are based on how predicted affinities are distributed and the level of awareness of the user community for a particular object. First, a set of subjects is selected for the classification. This can be all of the subjects, subjects that meet certain criteria, such as age, gender, or income, or a random sample, if necessary, to reduce computational load. Next, the set of objects are selected and the subject vectors are matched against the object vectors to generate predicted affinities of every subject against every object. For each object the distribution of affinities is determined, such as by histogram, variance, moments, or other measure of breadth of distribution. If the predicted affinities have a wide distribution (e.g., high variance), then a population of subjects will include those who have a strong affinity for the object as well as those who have a strong negative affinity for the object. On the other hand if the predicted affinities for the object have a narrow distribution (e.g., low variance), then the population of subjects views the object the same way. These differences can be used in devising a marketing strategy, for example, to decide whether a product, movie, or such should be marketed to a broad audience or targeted to a specific subset, or niche, of the market that will respond positively to the product. These marketing classifications can be further extended by comparing the extent, that is, the percentage, of subjects that have responded positively to an object with the number of subjects that are predicted to respond positively. This gives a measure of awareness of the object within its target market. For example, if the object has high awareness, then that would suggest that a marketing campaign is unnecessary or that it needs to be targeted towards maintaining consumption, such as in the case of consumables. If the object has low awareness, then the marketing campaign should be designed to reach the projected untapped target market.

Examples of how these marketing classifications might be presented to a user of a music application are presented in FIGS. 2-5.

Figure 2:
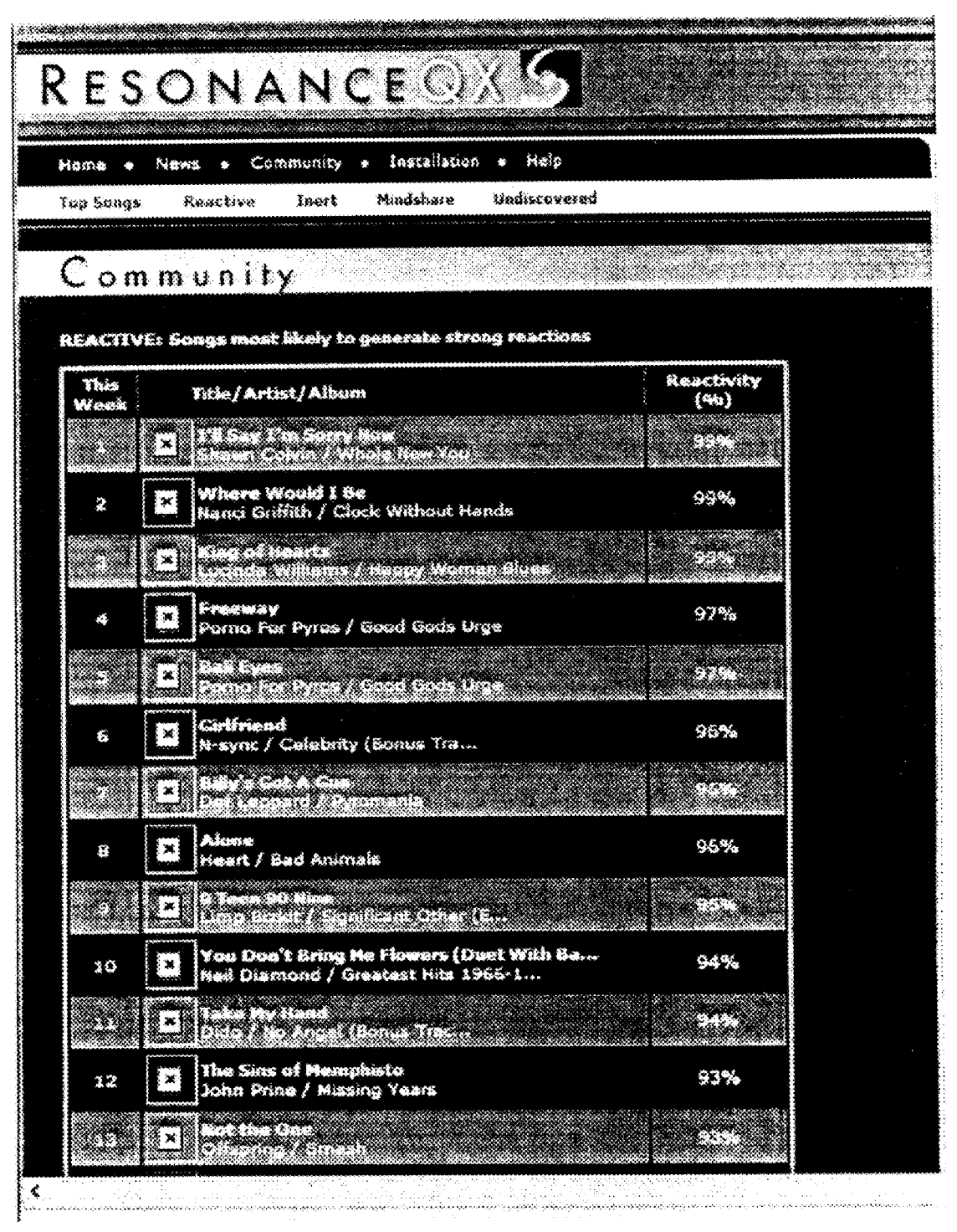

FIG. 2 shows an embodiment of a user interface that displays objects that elicit strong responses, both positive and negative, from different subjects.

Reactive: Songs most likely to generate strong reactions.

Figure 3:
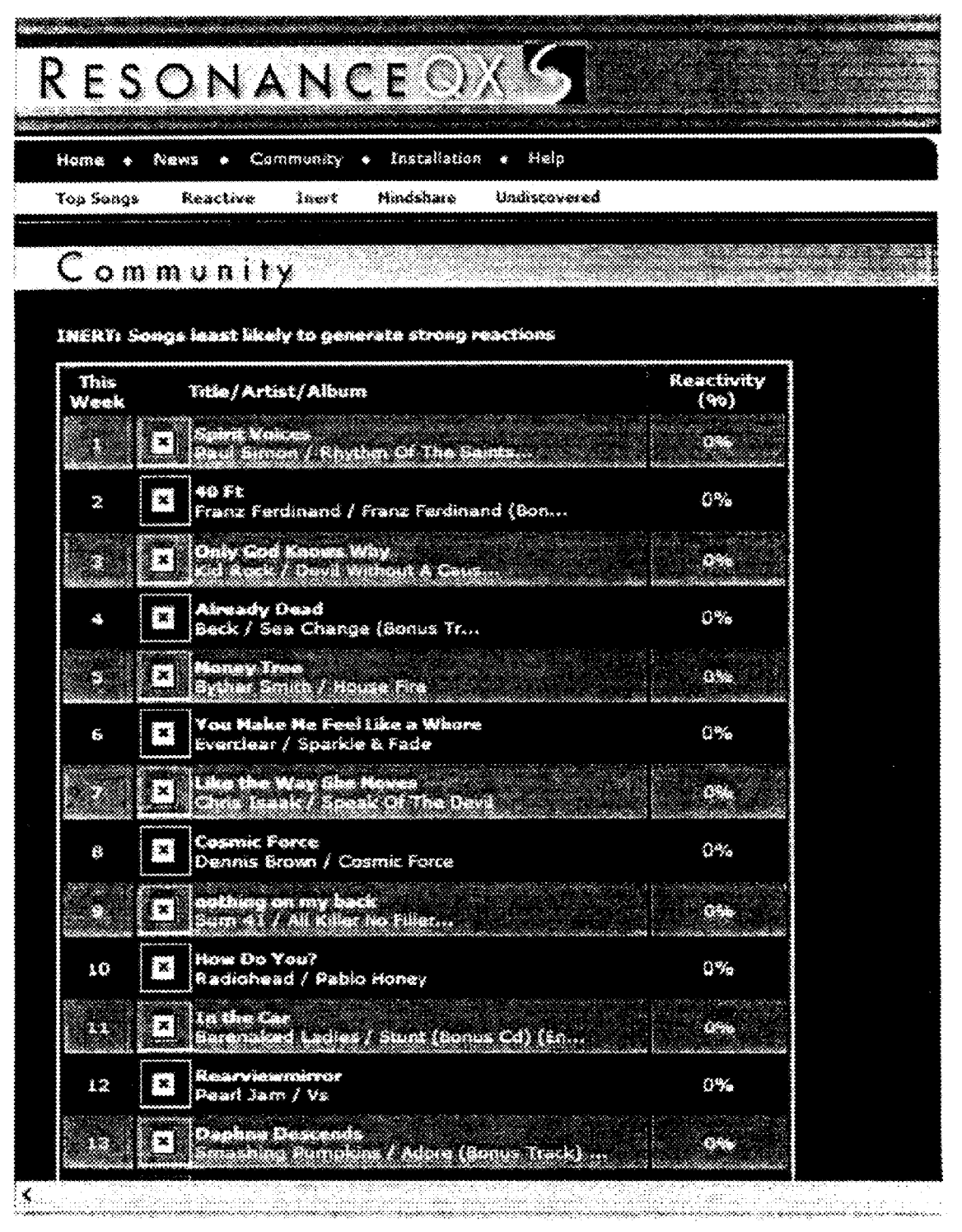

FIG. 3 shows an embodiment of a user interface that displays objects that are generally acceptable to a wide group of subjects.

Inert: Songs least likely to generate strong reactions.

Figure 4:
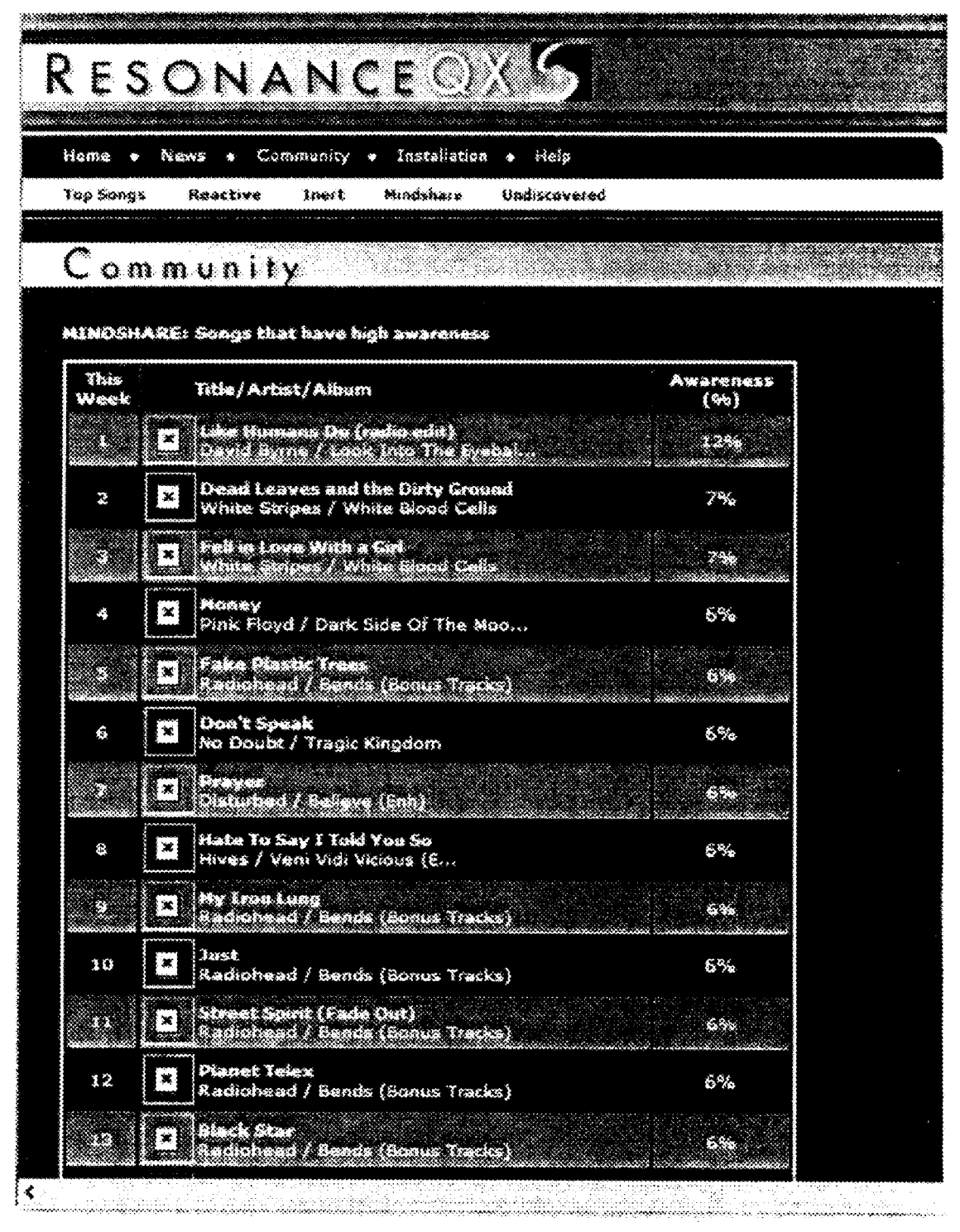

FIG. 4 shows an embodiment of a user interface that displays objects that have high penetration, or recognition, into a group of subjects.

Mindshare: Songs that have high awareness.

Figure 5:
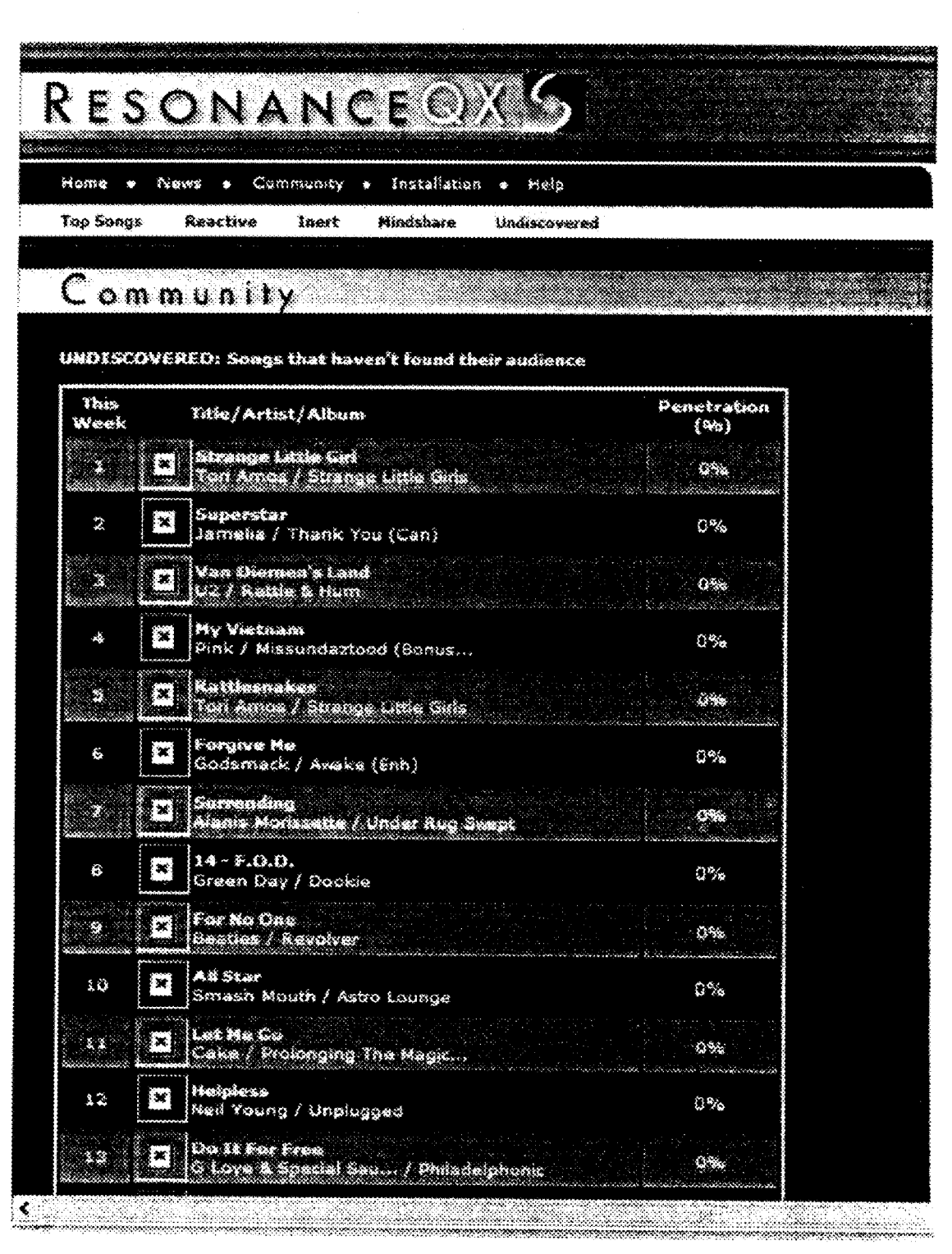

FIG. 5 shows an embodiment of a user interface that displays objects that have low penetration, or recognition, into a group of subjects.

Undiscovered: Songs that have not yet found their audience.

Figure 6:
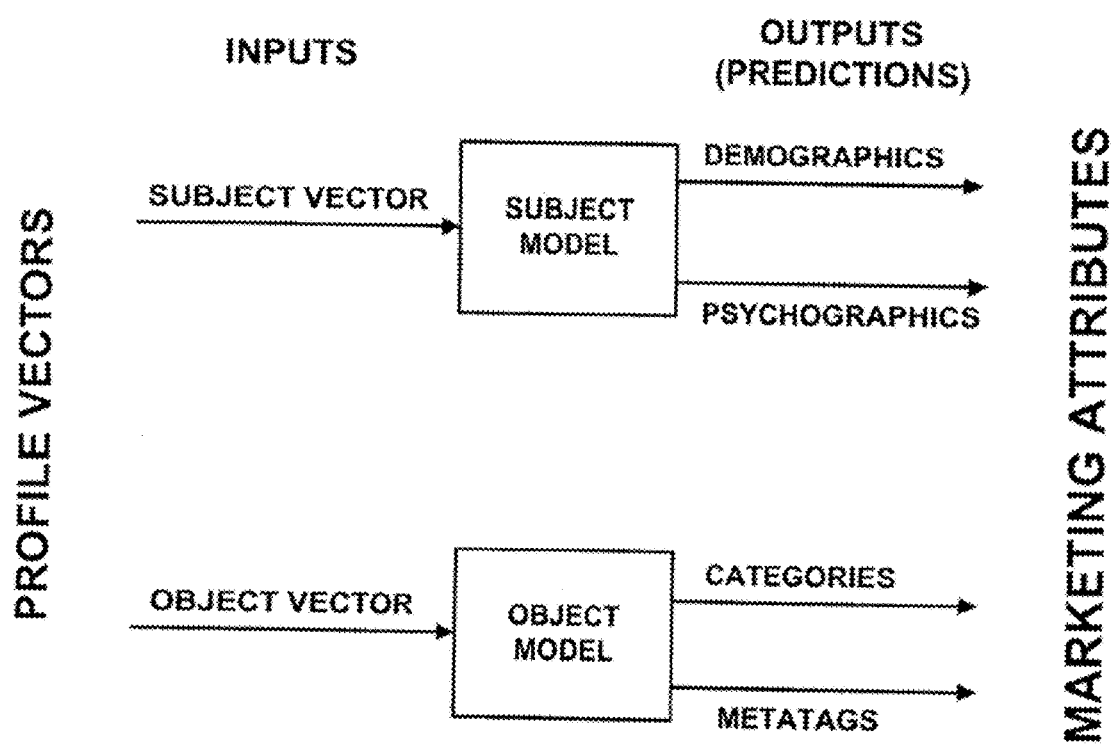
FIG. 6 shows the use of the profiles in combination with other attributes for marketing purposes.

FIG. 6 shows the use of the profiles in combination with other attributes for marketing purposes. Within the domain of an application, such as a website, the profiling system is anonymous; that is, it does not require specific personal information about the subjects, be it demographics such as age, gender, income, or location of residence. Similarly, the system objects are profiled from their behavior without knowledge of described characteristics, such as category, brand, or other metadata, so that the object profiling is automatically language-independent and culture-independent. This allows the system to automatically target groups of individuals through their anonymous identities, such as by presentation of targeted content through a website, e-mail, or mobile device. At the same time it is sometimes of interest to relate the derived object and subject attributes back to these marketing descriptors, for example to use customer profiles from website behavior to target a wider audience through online media, print advertising, television, and other contact points. Because the profiling process takes a sparse, arbitrary number of ratings and reduces them to a compact representation across all entities that puts all subjects and objects into the same representation, this allows the use of the profile vectors in inferring the marketing attributes. This is done by taking a known set of subjects, such as with known demographics, psychographics or other personal descriptors and with associated profile vectors, and building a model that predicts one or more attributes from the profile vectors. The model can be linear regression, neural network (multilayer perception), CART, or any other modeling or classification method that utilizes fixed length input sizes. Once this process is completed, it is then possible to describe clusters of profile vectors for these attributes. For example, the application owner may want to identity a new media buy or cross-marketing opportunity for a given product. By examining the attributes of the subject vector clusters that best match the product, the application user can associate the clusters with existing market segments and with new market segments. In cases where the marketing attributes are being used to generate market response models, an alternative use of the profile vectors is to augment the marketing attributes in these models by setting the inputs equal to the extended input set {marketing attributes+profiling vectors}, so that they are more accurate and complete than models with just the marketing attributes alone.

The details of the required processing to generate recommendations for a single user are shown and described below. The recommendation engine compares the subject profile vector, S, to every object vector, B, in the category set requested in the recommendation request. In the preferred embodiment, the match score between subject i and object j is calculated using the dot product $P_{ij}=S_i \cdot B_j$. The resulting set of scores is ranked from highest to lowest value, and the top values are returned to the application as the recommended objects for the user. Alternative match scoring methods include using Euclidean distance instead of the dot product, whereby the objects are ranked by closest distance first. Other alternative embodiments include requesting the match scores in other orders, such as lowest values first (e.g., "Bottom Ten") or alphabetic above a minimum score threshold, according to the needs of the application.

Further description of the subject and object representation for profiling subjects and objects and generating recommendations follows.

A subject is represented by a subject affinity vector $S=(S_1, S_2, \ldots, S_N)$, where N is the number of dimensions of the vector.

An object is represented by an object affinity vector $B=(B_1, B_2, \ldots, B_N)$, where N is the number of dimensions of the vector.

The number of dimensions of the subject and object vectors must be the same. The number of dimensions needed to represent a particular set of subjects and objects is not known a priori and is derived automatically by the system according to a method to be described further below.

The affinity, A, of a subject to an object is a single numeric value. This value is captured via feedback from the user, either directly from a user rating or indirectly through user interaction with the object environment. As presented to the subject in the application user interface, typical affinity ranges are 1 to 10, 1 to 5 stars, or like/dislike. Internally, the affinities are scaled between 0 and 1, with 0 being least affinity and 1 being highest affinity. In an alternative implementation, affinities can be scaled from −1 to +1. Note that an affinity can also be given a weight, w, which is used to determine how much consideration to give that affinity in deriving the associated subject and object profiles.

The predicted affinity, P, of a subject to an object is modeled by the dot product between their vectors:

$$P = S \cdot B = \sum_{i=1}^{N} S_i \times B_i.$$

The following shows the generation, or training, of the subject and object profile vectors. Training the vectors consists of adjusting the positions of a set of subject vectors, {S}, and a set of object vectors, {B}, to minimize the cost, or error, function $$f_{AE} \equiv \left[ \frac{1}{G} \sum_{i=1}^{Nsubjects} \sum_{j=1}^{Nobjects} (A_{ij} - w_{ij} S_i \cdot B_j)^2 \right]^{\frac{1}{2}},$$

where $A_{ij}$ is the affinity of the subject to the object, $w_{ij}$ is the weight of the measurement, and $$G = N_{subjects} \times N_{objects} \times N.$$

Determination of the optimal number of dimensions, N, for the subject and object vectors is an iterative process. At each iteration, the subject and object vectors are calculated using the method described below. Part of the data, called the test set, is not included in the modeling, or training, process. The test set provides an independent measurement of the predictive capability of the number of dimensions for that iteration. If the test set error is reduced for that iteration relative to the previous iteration, then the next number of dimensions (N→N+1) is trained and the testing process is repeated. Regardless of the change in the training set error, which will almost always decline with an increased number of model parameters, or vector dimensions, if the test error for the iteration is higher than the previous, then the training process is terminated, and the subject and object vectors for the previous, best iteration are saved for active, or live, system use. Note that at a given iteration, all subjects are eliminated that have rated fewer than N objects, and all objects are eliminated that have fewer than N ratings, where N is the number of vector dimensions at that iteration.

In practice $A_{ij}$ will only exist for certain subjects and objects and will likely be sparse. That is, it is not necessary for every subject to rate every object, but it is necessary that each subject rate at least as many objects as needed to meet the above training requirement for a specified number of profile dimensions. Further, the subject and/or object sets might be restricted for other specific retraining purposes, such as following the insertion or modification of an affinity. In this case we define A({S}, {B}) as the set of affinities for which subject i is a member of {S} and object j is a member of {B}. Affinity weights range from 0 to 1. The weight, w, is determined by the circumstances by which the affinity is measured. If the affinity comes from an explicit rating by the subject, then the measurement is fully weighted (w=1), whereas, if the affinity was inferred by the subject not selecting a specific option from a list of options, then the measurement is lower weighted.

There are several methods for calculating the subject and object vectors. In one method, the subject vectors are updated incrementally from step t to step t+1 via gradient descent:

$$S_i(t+1) = S_i(t) - \alpha \frac{\partial f_{AE}}{\partial S_i(t)}$$

for each subject i. The gradient is an analytical function of the subject vector, so that the update equation reduces to $$S_i(t+1) = S_i(t) + \frac{1}{G} \sum_{i=1}^{Nsubjects} \sum_{j=1}^{Nobjects} B_j(t)(A_{ij} - w_{ij}S_i(t) \cdot B_j(t)).$$

Similarly, the object vectors are updated according to $$B_j(t+1) = B_j(t) - \alpha \frac{\partial f_{AE}}{\partial B_j(t)}$$

for each object j, which reduces to $$B_j(t+1) = B_j(t) + \frac{1}{G} \sum_{i=1}^{Nsubjects} \sum_{j=1}^{Nobjects} S_i(t)(A_{ij} - w_{ij}S_i(t) \cdot B_j(t)).$$

At the update step t, all subject and object vectors are updated according to the above equations. The cost function is then re-evaluated with the t+1 vectors to determine whether it has reached the minimum within suitable criteria. In one embodiment, the criteria are as follows:

If the update step decreases the cost function, then the learning rate, $\alpha$, is increased by 10 percent up to a maximum of $\alpha=2$. If the update step overshoots the minimum so that the cost function actually increases, then the learning rate is decreased by 50 percent (a factor of two) and the update step is repeated. The update process is considered completed when the cost function is less than 10 to the power of −6 or when the learning rate is less than 10 to the power of −12. The learning process is aborted if the cost function increases to greater than 100. The actual numerical values used in these processes are configurable and are adjusted to make the learning process as efficient as possible without introducing numerical instability.

Figure 1B:
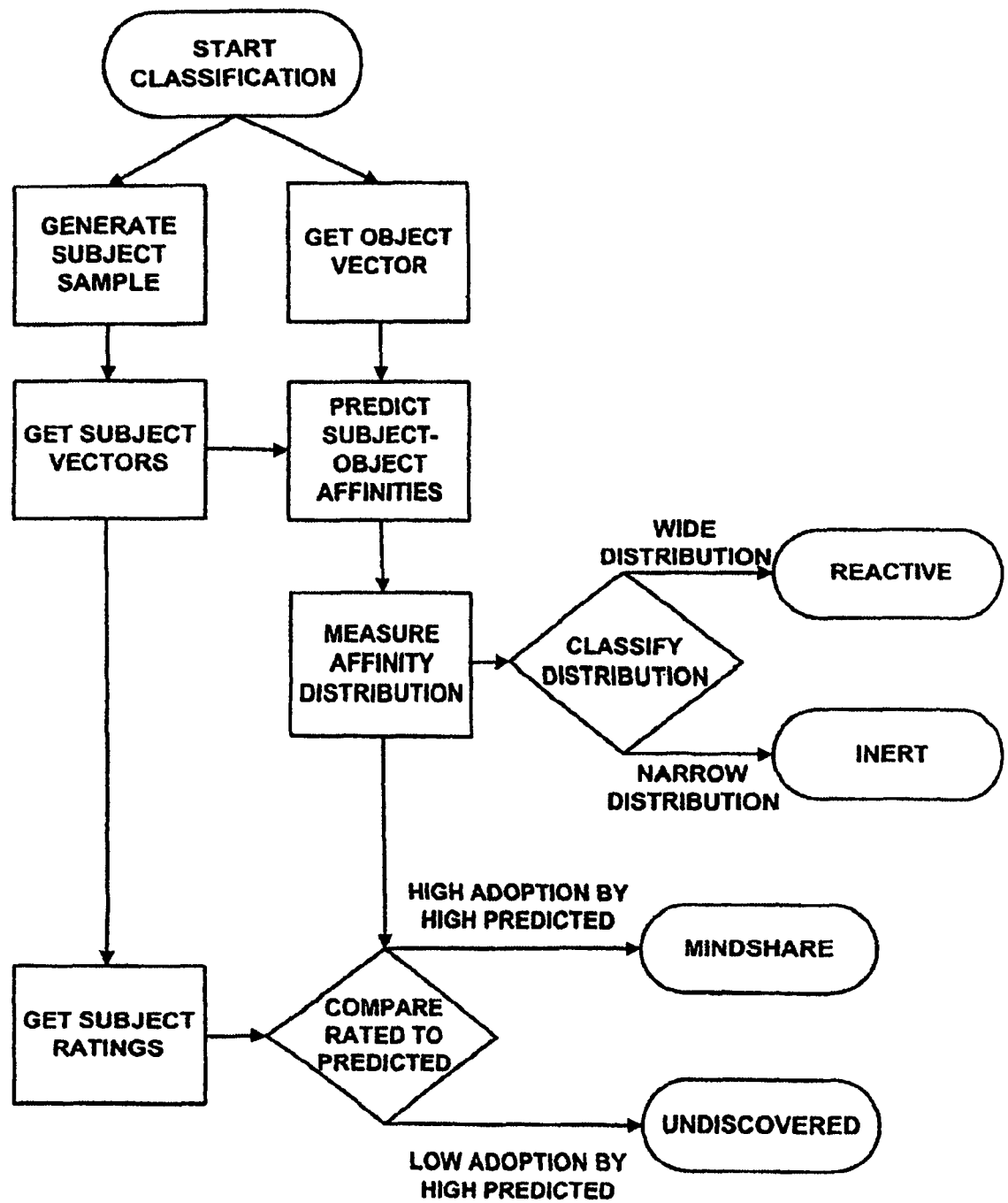

FIG. 1A shows the principal components of the system. As shown in the figure, there is an application client, such as a web browser, kiosk, or mobile phone, and a recommendation server, which is typically a centralized computer within a network or across the Internet. A subject interacts with a user interface. The subject indicates level of interest or affinity towards one or more objects either directly by rating objects of interest or indirectly by interacting with specific objects in the context of the application. These affinities are fed through a data collector to a data repository, which stores all of the affinities from the various clients. The affinities are used as the input to a profiler, which converts the subject-object affinity sequences into reduced, vectorized profiles of both subjects and objects. The resultant subject and object profiles are stored into a profile data repository. Finally, the recommender matches the subject profile to the object profiles and renders the recommendations through a dynamic presentation back to the user interface. As an alternative embodiment the recommendation request can be made through an intermediate server, which then renders the recommendations to the user interface. The profiling and recommendation process operates continuously, so that more accurate recommendations can be made to the subject as more affinities are collected from the subject. Because each subject and object has its own unique set of affinities, each subject and each object will have its own unique profile.

The end-user interface can be implemented using a variety of devices, including a personal computer, an in-store kiosk, a personal digital assistant (PDA), a mobile phone, a set top box, or an ordinary phone with voice capability.

The internal components of the recommendation server include a profiling engine, or profiler, pulls ratings and profile information out of the affinity database, calculates subject and object profiles, and stores the resultant profiles in their respective profile databases. The representations are multi-dimensional vectors, whereby each dimension represents an abstract attribute of the subject/object interaction. To make recommendations, the recommendation server, or affinity predictor, retrieves the subject and object profiles from the profile database. The subject and object profiles are used to determine a rank-ordered list of recommendations to be returned to the application client, according to the requested criteria of the application client.

The recommendation server stores the received ratings in an affinities database. Each entry of the affinities database consists of three values (subject_id, object_id, affinity), where the subject_id is a unique identifier of the person or other agent that generated the affinity, the object_id is a unique identifier of the entity that is being rated, and the affinity is a value indicating the affinity of the subject to the object. The rating can be any integer or continuous value that allows objects to be ranked by preference. Affinities can be entered explicitly or implicitly. Explicit affinities are those that result from a specific response of the subject, such as when the subject rates objects according to a predetermined rating scale. This can be as simple as a "Yes/No", "Good/Bad", or "Satisfied/Dissatisfied", or a more graduated scale, such as "1 to 10" or "Love, Like, OK, Dislike, Hate". Implicit affinities are those that are derived from the behavior of the user, such as online browsing or other interactions with the application's catalog of items. Affinities can also be inferred from the subject's interaction with an object for both recurring and non-recurring transactions. For example, in applications where the purchase or experience of the object is normally repeated by the subject, such as the purchase of consumer products, for example soap, ice cream, cereal, or wine, the subject's affinity can be inferred from the frequency of purchase by the subject; i.e., a single purchase would imply dissatisfaction, whereas frequent purchase, relative to the typical rate of consumption for that product across the entire subject population, would imply high satisfaction. As in the case of non-recurring transactions, the absence of an affinity would not be interpreted as an indication of subject preference either way. Similarly, for television shows, watching nearly every episode of a series would indicate high satisfaction, whereas occasional watching, particularly incomplete viewing, would indicate low satisfaction. For music playback, such as a radio, individual songs would be rated according to the amount of time that the subject listened to the song relative to the total opportunity that the subject had to listen.

The end-user interface verifies the identity of the subject based on some type of user ID generated by the application, such as a user name and password, biometric, browser cookie, mobile phone ID or other identification. In order to allow a subject to be known to the recommendation system through different applications, the system provides a user/subject lookup table that can map the user's different application identities to the common subject ID. Similarly, the application may present multiple variations of the same product, for example a hardbound vs. paperback version of the same book, or multiple sizes of the same shirt, which are mapped to the common object through the item/object lookup table.

A typical embodiment of the delivery of the system would be undertaken over the Internet. The end use application (Resonance customer) is a website that is external to the system and that communicates with the system via web services from the customer website or directly from the customer website's end user's client browser. As shown, the system may be distributed across multiple computers on a network. This consists of one or more web servers (or web farm), which collect data and process content recommendation requests. The web servers pass data to one or more application databases via a message queuing system that allows the web servers to continue processing while the much slower database servers feed the data into permanent storage, such as a direct attached RAID array, network attached storage (NAS), or storage area network (SAN). Additionally, a profiling engine retrieves affinity and other data from an application database and uses the data to generate the subject and object profiles, which are then stored back into the application database. The object vectors, active subjects' subject vectors, and any additional business rules logic are also cached on the web servers for faster match generation during live operation. In order to process an arbitrarily large number of visitors to the web servers are multiplexed using a load balancer, which makes a collection of web servers appear to the Internet as a single server. Also, when a web server becomes unavailable or out of service for any reason, the load balancer automatically transfers traffic to another server. This provides a high level of fault tolerance for the system. In order to provide additional service availability the database and web servers can be mirrored to a backup data center, whereby the backup datacenter goes into service when the main datacenter goes out of service. While waiting in backup mode, the backup datacenter can be used to analyze and simulate service improvements prior to releasing the changes to live traffic. Note that in this embodiment the service has been distributed over multiple servers. In an alternative embodiment all of the functions of the service could be put onto a single or smaller set of servers without a substantive change in the overall functionality of the service.

Another anticipated embodiment of the system would use web services on a distributed network. The website, content management, and web analytics modules are external to the system and communicate with the data collector, profiling engine, recommendation engine and catalog management modules via web services (REST or SOAP), such as using XML. The website requests information from the content management module and displays it on the browser. The browser generates user behavior data via the web analytics module. This can be done on the browser itself using JavaScript or on the web server using web logging or packet sniffing. Regardless of how this is done, the web analytics submits data via a web service call to the data collector. To display customized content the website requests information from the recommendation engine, which is fed through the content management module to get the display attributes of the recommended content and then displayed on the website. The content management module not only generates content for the website, it also feeds content information (metadata) to the catalog management module, which stores both information necessary to display content and descriptive attributes that may be applied to filter targeted content according to website-defined business rules or objectives.

The data collector converts the raw behavior data, such as clickstreams, into affinities, which are then processed into user (subject) and content (object) profiles. When a request is made to the recommendation engine for targeted content, the recommendation engine combines the subject and object profiles with the catalog metadata to find the optimal content subject to any business rules, or other restrictions, put on the results.

The above application embodiments are for example only. The invention does not restrict the design and implementation of the application in any way, as long as the interface to the recommendation engine matches the protocols defined by the interface guidelines. A key aspect of the invention is that, unlike other methods, it does not in fact use subject or object attributes, focus groups, or other traditional marketing techniques to identify target markets, but rather identifies target markets and predicts marketing effectiveness automatically, based on self-generated vector profiles derived from subject object interactions.

The foregoing description of a preferred embodiment has been presented by way of example only, and should not be read in a limiting sense. The scope of the present invention is defined only by the following claims.

In the claims reference characters used to designate claim steps are provided for convenience of description only, and are not intended to imply a particular order for performing the steps.

What is claimed is:

1. A system for digital media engagement, comprising:
a web-based computer system and network configured as:
(a) an application client which presents media options as objects to system users, wherein said system users are subjects, and measures and collects affinities of said subjects to said objects as actual affinities A, and further wherein said application client transmits said affinities to a recommendation server across said network;
(b) the recommendation server which represents and stores a profile of a said subject as a subject vector S, and a profile of a said object as an object vector B, such that a predicted affinity P of the subject to the object is generated by matching the subject vector to the object vector according to the dot product of S and B;
(c) a profiler of said recommendation server which trains the subject vectors and object vectors as a minimization of a cost function, E, based on the differences between the predicted and actual affinities of the subjects for the objects, for which actual affinities have been measured and stored in at least one database of the recommendation server, wherein the recommendation server starts with subject and object vectors of a specified number of dimensions, N, which values of the dimensions of the subject and object vectors are initially set to random values; then the object vectors are fixed and the subject vectors are updated to minimize the cost function, E; then the subject vectors are fixed and the object vectors are updated to minimize the cost function, E; and the above steps of fixing the object vectors and updating the subject vectors and then fixing the subject vectors and updating the object vectors are repeated until the change in the decrease of the cost function at the end of the update of the object vectors for that iteration is less than a specified limit, and the resulting trained subject vectors and object vectors are updated in the at least one database of the recommendation server;
whereby said cost function, E, is the mean squared error between the predicted affinities and the actual affinities:

$$E \equiv \left[ \frac{1}{G} \sum_{i=1}^{Nsubjects} \sum_{j=1}^{Nobjects} (A_{ij} - w_{ij} S_i \cdot B_j)^2 \right]^{1/2} ;$$

where $A_{ij}$ is the affinity of the subject $S_i$ to the object $B_j$, $w_{ij}$ is the weight of the measurement f the affinity based on whether an explicit action by the subject was received by the recommendation server, the predicted affinity is the dot product, $S_i \cdot B_j$, of the subject $S_i$ and the object $B_j$, and $$G = N_{subjects} \times N_{objects} \times N;$$

(d) wherein said recommendation server includes a recommendation engine which selects the subjects, and selects one of the objects;
(e) further wherein said recommendation engine generates the predicted affinities of said selected subjects to said object using said matching of the subject vector to the object vector;
(f) further wherein said recommendation engine combines the predicted affinities for said selected subjects and said selected object into a distribution of said predicted affinities for said object;
(g) further wherein said recommendation engine calculates the breadth of said distribution of predicted affinities as the variance of said predicted affinities for said selected subjects and said selected object; and
(h) wherein said recommendation engine in the recommendation server transmits said media options to said application client to display lists of available content ranked in ascending or descending order of said breadth of distribution, based on the resulting trained subject vectors and object vectors updated in the at least one database of the recommendation server.

2. The system for digital media engagement, according to claim 1, wherein said select subjects includes selecting all of the subjects, subjects that meet certain criteria, or a random sample.

3. The system for digital media engagement, according to claim 1, wherein said subject and object profiles include subject and object vectors derived from anonymous website browsing behavior.

4. The system for digital media engagement, according to claim 1, wherein said measure the affinities of subjects to objects includes measuring affinities as explicit ratings of the objects by the subjects.

5. The system for digital media engagement, according to claim 1, wherein said measure the affinities of subjects to objects includes measuring the affinity of a subject to an object based on a level of interaction of the subject to the object.

6. The system for digital media engagement, according to claim 1, wherein said predicted affinity of a subject to an object is generated by matching the subject vector to the object vector includes matching the subject vector to the object vector using a Euclidean distance between the subject vector and the object vector.

7. The system for digital media engagement, according to claim 1, wherein said classify said object according to the breadth of said distribution of predicted affinities includes determining the breadth of distribution of affinities by histogram or moments.

8. The system for digital media engagement, according to claim 1, wherein said object that has a breadth of distribution of said predicted affinities above a specified breadth threshold is classified as REACTIVE and said object that has a breadth of distribution of said predicted affinities below a specified threshold is classified as INERT.

9. The system for digital media engagement, according to claim 1, whereby only objects with said breadth of distribution below a specified breadth threshold are presented to users as recommended options.

10. A system for digital media engagement, comprising:
a web-based computer system and network configured to include:
(a) an application client which presents media options as objects to system users, wherein said system users are subjects, and measures and collects affinities of said subjects to said objects as actual affinities A, and further wherein said application client transmits said affinities to a recommendation server across said network;
(b) the recommendation server which represents and stores a profile of a said subject as a subject vector, S, and a profile of a said object as an object vector, B, such that a predicted affinity, P, of the subject to the object is generated by matching the subject vector to the object vector according to the dot product of S and B;

(c) a profiler of said recommendation server which trains the subject vectors and object vectors as a minimization of a cost function E, based on the differences between the predicted and actual affinities of the subjects for the objects for which actual affinities have been measured and stored in at least one database of the recommendation server, the recommendation server starts with subject and object vectors of a specified number of dimensions, N, which values of the dimensions of the subject and object vectors are initially set to random values; then the object vectors are fixed and the subject vectors are updated to minimize the cost function, E; then the subject vectors are fixed and the object vectors are updated to minimize the cost function, E; and the above steps of fixing the object vectors and updating the subject vectors and then fixing the subject vectors and updating the object vectors are repeated until the change in the decrease of the cost function at the end of the update of the object vectors for that iteration is less than a specified limit, and the resulting trained subject vectors and object vectors are updated in the at least one database of the recommendation server;

whereby said cost function, E, is the mean squared error between the predicted affinities and the actual affinities:

$$E \equiv \left[ \frac{1}{G} \sum_{i=1}^{Nsubjects} \sum_{j=1}^{Nobjects} (A_{ij} - w_{ij} S_i \cdot B_j)^2 \right]^{1/2} ;$$

where $A_{ij}$ is the affinity of the subject $S_i$ to the object $B_j$, $w_{ij}$ is the weight of the measurement of the affinity based on whether an explicit action by the subject was received by the recommendation server, the predicted affinity is the dot product, $S_i \cdot B_j$, of the subject $S_i$ and the object $B_j$, and $$G = N_{subjects} \times N_{objects} \times N;$$

(d) wherein said recommendation server includes a recommendation engine which selects the subjects, and selects one of the objects;

(e) further wherein said recommendation engine generates the predicted affinities of said selected subjects to said object using said matching of the subject vector to the object vector, (f) further wherein said recommendation engine calculates an awareness level of said object by said subjects as the ratio of the number of subjects with actual affinities greater than a specified affinity threshold to the number of subjects with predicted affinities greater than said specified affinity threshold; and (g) wherein said recommendation engine in the recommendation server transmits said media options to said application client to display lists of available content ranked in ascending or descending order of said level of awareness content, based on the resulting trained subject vectors and object vectors updated in the at least one database of the recommendation server.

11. The system for digital media engagement, according to claim 10, wherein said select subjects includes selecting all of the subjects, subjects that meet certain criteria, or a random sample.

12. The system for digital media engagement, according to claim 10, wherein said subject and object profiles include subject and object vectors derived from anonymous website browsing behavior.

13. The system for digital media engagement, according to claim 10, wherein said measure the affinities of subjects to objects includes measuring affinities as explicit ratings of the objects by the subjects.

14. The system for digital media engagement, according to claim 10, wherein said measure the affinities of subjects to objects includes measuring the affinity of a subject to an object based on a level of interaction of the subject to the object.

15. The system for digital media engagement, according to claim 10, wherein said predicted affinity of a subject to an object is generated by matching the subject vector to the object vector includes matching the subject vector to the object vector using a Euclidean distance between the subject vector and the object vector.

16. The system for digital media engagement, according to claim 10, whereby objects with said level of awareness below a specified awareness threshold are presented as recommended options to those users who have not provided actual affinities for said objects and have predicted affinities for said objects above a specified affinity threshold.

17. The system for digital media engagement, according to claim 10, wherein said object having an awareness level above a specified awareness threshold for a group of subjects is classified as MINDSHARE, and said object having an awareness level below a specified awareness threshold for a group of subjects is classified as UNDISCOVERED.

* * * * *